3,219,574
CONVERSION OF CATALYTIC GAS OIL TO
LOWER BOILING HYDROCARBONS
Abraham Schneider, Overbrook Hills, Pa., assignor to
Sun Oil Company, Philadelphia, Pa., a corporation of
New Jersey
Filed Sept. 3, 1963, Ser. No. 306,310
5 Claims. (Cl. 208—57)

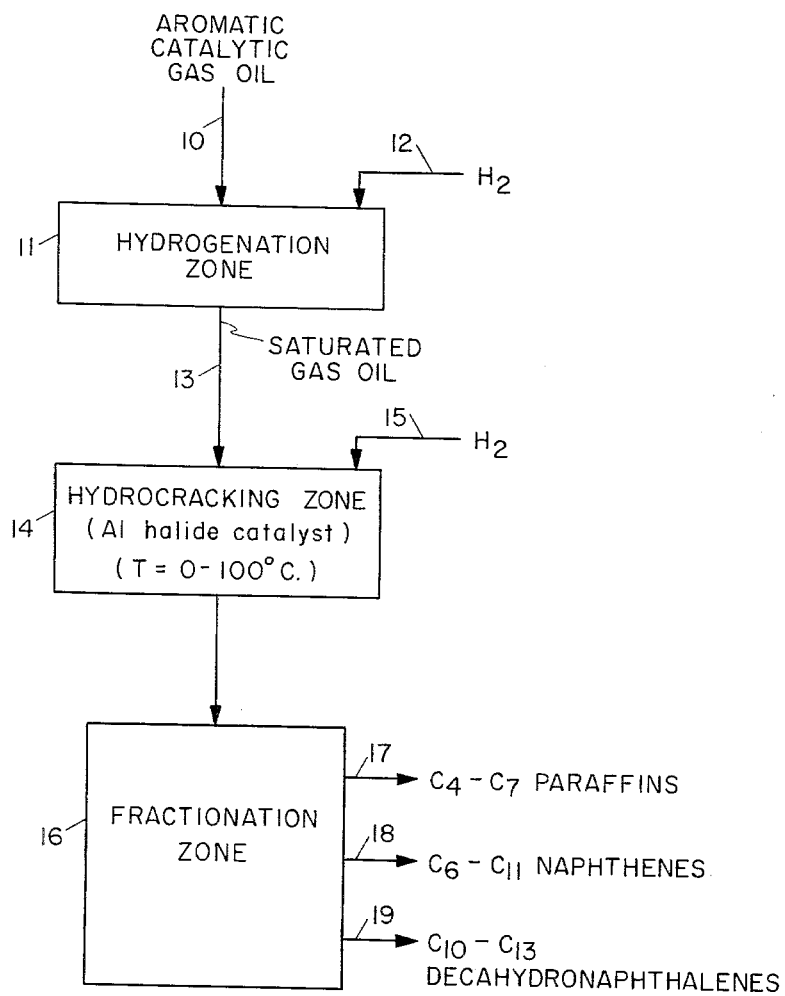

This application is a continuation-in-part of my copending application Serial No. 153,748, filed November 20, 1961, and now abandoned.

This invention relates to the conversion of catalytic gas oil stocks at relatively low temperatures to form lower boiling saturated hydrocarbons including $C_4$–$C_7$ paraffins, $C_6$–$C_{11}$ monocyclic naphthenes and $C_{10}$–$C_{13}$ or $C_{14}$ decahydronaphthalenes.

In my copending application Serial No. 89,130, filed February 14, 1961, and now abandoned, a low temperature process is described which is capable of converting saturate hydrocarbon fractions derived from straight run gas oils into hydrocarbons of the gasoline boiling range. The process involves admixing the saturate hydrocarbon charge with a naphthene having 7 to 9 carbon atoms per molecule and reacting the mixture at 0—100° C. under a hydrogen pressure in the presence of an $AlBr_3$-HBr catalyst. The function of the $C_7$–$C_9$ naphthenes in the reaction mixture is to inhibit various undesirable reactions that otherwise would result in sludge formation. The $C_7$–$C_9$ naphthene itself does not undergo any reaction other than equilibration to a mixture of its isomers and hence can be recovered from the reaction product and reused.

It has now been found that gas oil cycle stocks from catalytic cracking can be converted substantially entirely to $C_4$–$C_7$ paraffins, $C_6$–$C_{11}$ monocyclic naphthenes and $C_{10}$–$C_{14}$ decahydronaphthalenes in a processing sequence one step of which is partly analogous to the reaction step of my prior process in which an $AlBR_3$-HBr catalyst is used. However, I have now found that when the hydrocarbon charge for such step is prepared from catalytic gas oil as hereinafter described, no addition of a $C_7$–$C_9$ naphthene to the reaction mixture is required in order to avoid the formation of sludge. In the present process the hydrocarbon portion of the reaction mixture consists only of the hydrocarbons derived from the catalytic gas oil stock without any added lower molecular weight naphthene.

Catalytic gas oil cycle stocks contain aromatic hydrocarbon components generally ranging in amount from 30% up to 90% by volume. The aromatics are preponderantly of the condensed ring type, being mainly alkyl naphthalenes. Lesser amounts of components having one aromatic ring condensed with a nonaromatic ring, such as indanes and indenes, may also occur but little if any alkyl benzenes are present. The number of carbon atoms in the aromatic components generally range from 10 to 25.

I have now found that if these aromatic components are converted to the corresponding naphthenes by substantially complete hydrogenation of a catalytic gas oil stock, the resulting mixture of saturate hydrocarbons can be reacted under a hydrogen pressure in the presence of either an $AlBr_3$-HBr or $AlCl_3$-HCl catalyst with essentially no sludge formation occurring. The hydrogenated material can be converted substantially completely into the following three classes of hydrocarbon products: (1) $C_4$–$C_7$ paraffins which are preponderantly isoparaffins, (2) $C_6$–$C_{11}$ naphthenes which are monocyclic, and (3) $C_{10}$–$C_{13}$ or $C_{14}$ decahydronaphthalenes with the alkyl groups being practically all methyl substituents. Since there is little overlapping in the boiling ranges of these hydrocarbon classes, the product can be resolved by distillation into fractions of specific hydrocarbon types. Hence the fractions are valuable as petrochemical sources. The products of gasoline boiling range also are useful as high antiknock components in the manufacture of gasoline.

According to the invention, an aromatic catalytic gas oil stock is hydrogenated to form a substantially saturated gas oil which contains naphthenes corresponding to the aromatics in the catalytic gas oil stock. These naphthenes are mainly alkyl decahydronaphthalenes. The hydrogenated gas oil is then reacted at a temperature in the range of 0–100° C. in the presence of either an $AlBr_3$-HBr or $AlCl_3$-HCl catalyst while in contact with hydrogen under a partial pressure of 25–1000 p.s.i. The reaction is allowed to proceed for sufficient time to convert at least a major portion of the saturated gas oil into lower boiling hydrocarbons, and the hydrocarbons so obtained, including $C_4$–$C_7$ paraffins, $C_6$–$C_{11}$ naphthenes and $C_{10}$–$C_{13}$ or $C_{14}$ decahydronaphthalenes, are recovered from the reaction mixture.

The process is illustrated schematically in the accompanying drawing. An aromatic catalytic gas oil is introduced, as indicated by line 10, into a hydrogenation zone 11 to which hydrogen is fed as shown by line 12. From the hydrogenation zone an essentially saturated gas oil is obtained, as indicated at 13, and is sent to a hydrocracking zone 14. Gaseous hydrogen is fed via line 15 to the hydrocracking zone to maintain therein a hydrogen partial pressure in the range of 25–1000 p.s.i. The hydrocracking reaction is effected at a temperature in the range of 0–100° C. by means of an aluminum halide catalyst as hereinafter described. The hydrocarbon reaction product from zone 14 can then be fractionated as indicated by fractionation zone 16. If desired, separate fractions can be obtained which are mainly $C_4$–$C_7$ paraffins, $C_6$–$C_{11}$ naphthenes and $C_{10}$–$C_{13}$ decahydronaphthalenes as indicated, respectively, by lines 17, 18 and 19.

The hydrogenation step of the present process can be carried out by any of the procedures known in the art that are effective for substantially completely saturating polycyclic aromatics. The hydrogenation should be done in a manner such that the aromatic content of the hydrogenated product is less than 1% by weight and more preferably less than 0.5%. Conventional hydrogenation catalysts such as platinum, nickel, nickel sulfide-tungsten sulfide, cobalt molybdate or molybdenum disulfide carried on an alumina support can be used. Conditions for the hydrogenation reaction suitably include a temperature in the range of 450 to 550° F., a hydrogen pressure of 400 to 750 p.s.i., hydrogen to hydrocarbon molar ratios of 5:1 to 30:1 and space velocities of 0.2 to 2.0. When a hydrogenation catalyst is used that is sensitive to sulfur compounds, such as a platinum or nickel catalyst, it is desirable first to subject the catalytic gas oil to a conventional hydrodesulfurization step to remove the sulfur prior to the hydrogenation step.

The reaction for converting the hydrogenated gas oil into lower boiling hydrocarbons is effected by means of an aluminum bromide-hydrogen bromide catalyst or an aluminum chloride-hydrogen chloride catalyst. Preferably the catalyst is a pre-formed complex of these halogen-containing components with paraffin hydrocarbons as hereinafter described. These catalyst complexes are insoluble in hydrocarbons. The temperature for carrying out the reaction is in the range of 0–100° C. and more preferably 25–75° C. Free hydrogen at a partial pressure in the range of 25–1000 p.s.i., more preferably 100–500 p.s.i., must be present during the reaction, and the reaction mixture should be continuously agitated to promote diffusion of the hydrogen into the hydrocarbon phase. The time required for converting a major portion of the hydrogenated gas oil charge into lower boiling hydrocarbons will depend considerably upon the temperature selected within the 0–100° C. range. At the lower end of the range a time as long as 60 hours may be required, while at the upper end of the range the reaction may occur in 5 to 15 minutes.

As previously stated, an aluminum halide catalyst obtained by combining $AlCl_3$ with HCl or $AlBr_3$ with HBr is used to convert the hydrogenated catalytic gas oil to lower boiling hydrocarbons. With either aluminum halide the catalyst preferably is a liquid complex obtained by reacting the aluminum halide and hydrogen halide in the presence of one or more paraffin hydrocarbons having at least seven and more preferably at least eight carbon atoms. When $AlCl_3$ is used it is preferable to use paraffin hydrocarbons which have more than eight carbon atoms. This complex type of catalyst is insoluble in the reaction mixture, and the activity of the catalyst depends upon having at least a small amount of uncomplexed $AlCl_3$ or $AlBr_3$ present therein. The catalyst complex is a colored mobile liquid and typically in the case of $AlBr_3$ is bright orange-yellow. In preparing the complex any paraffin hydrocarbon or mixture of such paraffins having seven or more carbon atoms can be used, but it is desirable to use a branched paraffin, e.g., one having at least two branches, in order to reduce the time for preparing the complex and it is particularly preferred that such isoparaffins have at least eight carbon atoms per molecule. A slow degradation of the catalyst may occur over a course of time, particularly when $AlBr_3$ is used to make the catalyst, but the addition of a small amount of fresh aluminum halide from time to time will reactivate the catalyst. Also a portion or all of the catalyst complex can be replaced from time to time by fresh catalyst complex to maintain catalytic activity.

Preparation of the catalyst complex comprises dissolving or suspending the aluminum halide in the paraffin hydrocarbon and passing the hydrogen halide into the mixture. This can be done at room temperature, although the use of an elevated temperature such as 50–100° C. generally is desirable to increase the rate of reaction. For best results at least five moles of the paraffin per mole of $AlCl_3$ or $AlBr_3$ should be employed. Under these conditions some of the paraffin evidently breaks into fragments, yielding a $C_4$ fragment which becomes the hydrocarbon portion of the complex. In the case of $AlBr_3$, as the reaction proceeds the mixture becomes milky and the orange-yellow liquid complex then precipitates from the hydrocarbon phase. Addition of HBr is continued until the milky appearance has disappeared. For obtaining the most active catalyst complex the addition of HBr should be stopped at this point. When $AlCl_3$ is used to make the catalyst, such milky appearance does not appear as the HCl is added. Instead the particles of $AlCl_3$ in suspension in the hydrocarbon merely become converted to the liquid complex. The addition of HCl is stopped before all of the $AlCl_3$ reacts so that the complex formed will contain some $AlCl_3$ particles suspended therein. The resulting complexes made with either $AlCl_3$ or $AlBr_3$ are relatively stable materials having high catalytic activity.

When the aluminum halide is $AlBr_3$, the catalyst can also be used with the $AlBr_3$ dissolved in the hydrocarbon reactants so that the reaction mixture is homogeneous. When using this type of catalyst system, the $AlBr_3$ is dissolved in the hydrogenated gas oil to the extent of 20–200% by weight on the total hydrocarbon and HBr is pressured into the mixture in amount of at least 0.25% by weight of the hydrocarbon. The amount of HBr in the system, expressed as a partial pressure, has an effect upon reaction rate up to a partial pressure of the order of 10–15 p.s.i. but thereafter its effect on rate diminishes rapidly. At HBr partial pressures above 20 p.s.i., rates are determined mainly by the reaction temperature and the concentration of $AlBr_3$ in the hydrocarbons. The resulting reaction mixture remains homogeneous as the reaction occurs. With $AlCl_3$ a homogeneous system cannot be used since $AlCl_3$ is essentially insoluble in hydrocarbons.

The following illustrative examples show the use of both homogeneous and heterogeneous systems for the conversion of the hydrogenated catalytic gas oil. In each example the original feed material was a catalytic gas oil cycle stock, produced in a moving bed type catalytic cracking plant employing a conventional silica-alumina cracking catalyst, which had been hydrodesulfurized at 700° F. using a cobalt molybdate-alumina desulfurization catalyst. The feed had a boiling range of 400 to 650° F. and an aromatic content of about 47% by weight.

*Example I*

The catalytic gas oil feed was subjected to hydrogenation to produce a substantially saturated gas oil having an aromatic content of 0.26% by weight. The hydrogenation catalyst used was platinum-on-alumina containing 1% platinum and the reaction conditions included a temperature of about 475° F., a hydrogen to hydrocarbon molar ratio of 10:1, a pressure of about 500 p.s.i.g., and a space rate of 0.6. The hydrogenated product contained about 50% decahydronaphthalenes.

A homogeneous reaction mixture was prepared in a rocker bomb dissolving 7.67 g. of $AlBr_3$ in 8.27 g. of the hydrogenated gas oil and introducing HBr (1.11 g.) to a pressure of 48 p.s.i.g. Hydrogen was then added until the total pressure was 410 p.s.i.g. and the mixture was agitated at a temperature of about 87° F. for 79 minutes during which time the pressure dropped to 287 p.s.i.g. The temperature was then raised to 132° F. and additional hydrogen was added to bring the pressure to 390 p.s.i.g. The mixture was agitated at 132° F. for an additional 90 minutes by which time the pressure had dropped to 377 p.s.i.g. The amounts of hydrogen consumed during the two agitation periods were equivalent, respectively, to 347 and 48 s.c.f. per barrel of hydrocarbon. This indicates that about 87% of the reaction occurred during this first period at 87° F.

The product from the foregoing reaction was analyzed by vapor phase chromatography, and the composition in terms of weight percent is shown in the accompanying table (Run No. 1).

*Example II*

In this example another sample of the hydrogenated gas oil prepared as described in Example I was converted in a heterogeneous system using a catalyst complex. The latter was prepared by reacting 100 parts by weight of $AlBr_3$, 47.5 parts of mixed dimethylhexanes and 8.6 parts of HBr at 75° C. in a bomb which was intermittently shaken for about 30 minutes. The mixture was cooled and allowed to separate, and the excess hydrocarbon which separated as an upper phase was decanted. The catalyst layer was a mobile oily liquid having an orange-yellow color.

16.61 g. of the so prepared catalyst complex and 8.20 g. of the hydrogenated gas oil were added to a rocker bomb, and 1.40 g. of HBr were introduced into the bomb raising the pressure to 46 p.s.i.g. Hydrogen was pressured into the bomb and the temperature was brought to 93° F. at which level the pressure initially was 440 p.s.i.g. The bomb was agitated at this temperature for 45 minutes during which time the pressure dropped to 350 p.s.i.g. The bomb was then cooled to 0° C and the hydrocarbon product was separated from the catalyst complex. No change in appearance of the catalyst was noted. Results of analysis of the hydrocarbon product are also shown in the accompanying table (Run No. 2).

*Example III*

This example illustrates the use of an $AlCl_3$ complex catalyst. The latter was prepared by reacting 40 ml. of 2,2,5-trimethylhexane with 15 g. of AlCl₃ at 65–75° C. while bubbling HCl into the mixture. The mixture was cooled and allowed to stratify, and the excess hydrocarbon was decanted. The catalyst layer was a mobile oily liquid having a yellow-brown color.

A rocker bomb was charged with 14.9 g. of the so prepared complex, 6.95 g. of uncomplexed AlCl₃ and 12.8 g. of hydrogenated catalytic gas oil. Gaseous HCl was introduced into the bomb in amount of 2.43 g. and H₂ was pressured into the bomb. The bomb was heated to 35.5° C. at which temperature the total pressure was 416 p.s.i.g. with the partial pressure of the HCl being 163 p.s.i. The reaction was carried out for 30 minutes at 35.5° C. Three times during the reaction the pressure dropped to 359 p.s.i.g. at which point it was brought back to the initial pressure level by addition of H₂. The catalyst did not change in appearance during the reaction. Analytical results of the product are shown in the table (Run No. 3).

|  | Wt. Percent of Total Hydrocarbon Product | | |
|---|---|---|---|
|  | Run No. 1 | Run No. 2 | Run No. 3 |
| C₄ paraffin | 13.7 | 9.3 | 18.9 |
| C₅ paraffin | 12.1 | 9.7 | 15.8 |
| C₆ paraffin | 7.8 | 6.8 | 9.9 |
| C₇ paraffin | 5.6 | 4.9 | 6.6 |
| Total paraffins | 39.2 | 30.7 | 51.2 |
| C₆ naphthene (monocyclic) | 1.2 | 0.5 |  |
| C₇ naphthene | 5.0 | 4.4 | 3.3 |
| C₈ naphthene | 6.6 | 6.9 | 5.4 |
| C₉ naphthene | 5.9 | 6.9 | 5.7 |
| C₁₀ naphthene | 5.8 | 6.4 | 6.0 |
| C₁₁ naphthene | 1.0 | 1.3 |  |
| Total naphthenes | 25.5 | 26.4 | 20.4 |
| Decahydronaphthalene | 1.3 | 1.4 | 1.0 |
| Methyldecahydronaphthalenes | 8.2 | 8.5 | 5.0 |
| Dimethyldecahydronaphthalenes | 11.4 | 12.7 | 7.4 |
| Trimethyldecahydronaphthalenes | 7.3 | 9.3 | 5.8 |
| Tetramethyldecahydronaphthalenes | 7.2 | 9.8 | 8.0 |
| Higher boiling |  | 1.4 | 1.3 |

From the data shown in the table it can be seen that each type of catalyst system gives a product composed essentially of three types of saturated hydrocarbons, namely, C₄–C₇ paraffins (predominantly isoparaffins), C₆–C₁₁ monocyclic naphthenes and decahydronaphthalenes in which substituents are methyl groups. The members for each molecular weight level for both the monocyclic naphthenes and the decahydronaphthalenes are essentially an equilibrium mixture of isomers; for example, the C₁₀ naphthenes are an equilibrium mixture of isomers and the same is true of the dimethyldecahydronaphthalenes. Practically no products other than the three hydrocarbon types shown are obtained in the process. Considering the fact that the feed material is a complicated mixture of gas oil hydrocarbons resulting from catalytic cracking, the products of the process seem remarkably simplified as to hydrocarbon types of boiling ranges which mainly do not overlap. This desirable circumstance is a result of the influence on the course of the reaction of the naphthenes produced by hydrogenating the aromatics in catalytic gas oil. These naphthenes evidently exert an inhibitory effect and prevent side reactions that otherwise would occur and result in a more complicated composition of reaction products.

It can be noted from the data given in the table that only about 7–11% of material boiling above the trimethyl-decahydronaphthalenes appeared in the product in the two runs described. Run Nos. 2 and 3 indicate that most of this material was tetramethyldecahydronaphthalenes and that hardly any material having more than 14 carbon atoms was present. Operation either at higher temperatures or for longer reaction times or both would have resulted in the conversion of essentially all of the tetramethyldecahydronaphthalenes and higher boiling components to lower boiling hydrocarbons of the types described.

I claim:

1. Method of converting an aromatic catalytic gas oil stock into lower boiling saturated hydrocarbons which comprises hydrogenating said stock to form a substantially saturated gas oil containing naphthenes corresponding to the aromatics in the catalytic gas oil stock, reacting said saturated gas oil in the absence of added lower molecular weight naphthene hydrocarbon at a temperature of 0–100° C. in the presence of a catalyst selected from the group consisting of AlCl₃-HCl catalyst and AlBr₃-HBr catalyst while in contact with hydrogen under a partial pressure of 25–1000 p.s.i., continuing the reaction for a time sufficient to convert at least a major portion of the saturated gas oil into lower boiling hydrocarbons, and recovering from the reaction mixture hydrocarbons so obtained mainly comprising C₄–C₇ paraffins, C₆–C₁₁ monocycle naphthenes and C₁₀–C₁₃ decahydronaphthalenes.

2. Method according to claim 1 wherein said temperature is 25–75° C.

3. Method according to claim 1 wherein said catalyst is a combination of AlBr₃ and HBr dissolved in said saturated gas oil and the amount of AlBr₃ is 20–200% by weight based on the gas oil.

4. Method according to claim 1 wherein said catalyst is a pre-formed liquid complex obtained by reacting AlCl₃, HCl and paraffin hydrocarbon having at least seven carbon atoms.

5. Method according to claim 1 wherein said catalyst is a pre-formed liquid complex obtained by reacting AlBr₃, HBr and a paraffin hydrocarbon having at least seven carbon atoms.

References Cited by the Examiner

UNITED STATES PATENTS

| 3,080,311 | 3/1963 | Mertes et al. | 208—78 |
| 3,092,567 | 6/1963 | Kozlowski et al. | 208—57 |
| 3,132,089 | 5/1964 | Hass et al. | 208—58 |

DELBERT E. GANTZ, *Primary Examiner.*

ALPHONSO D. SULLIVAN, *Examiner.*